Dec. 19, 1967     J. V. CLANCY ET AL     3,358,970
AUTOMATIC SHUT-OFF FOR INTERRUPTING FLOW
OF GRANULAR MATERIAL TO A SUPPLY HOPPER
Filed June 7, 1966
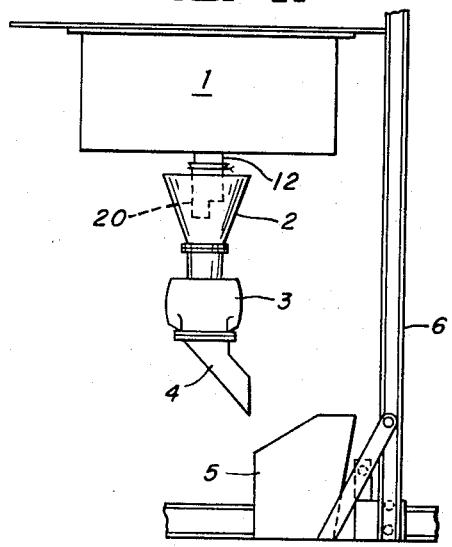
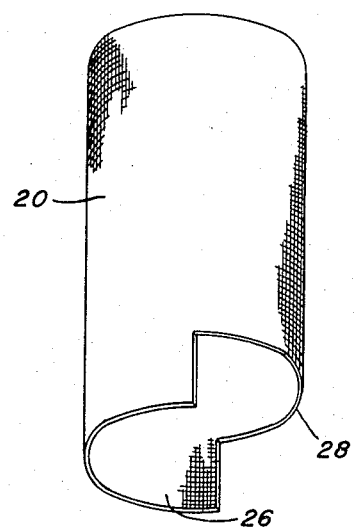
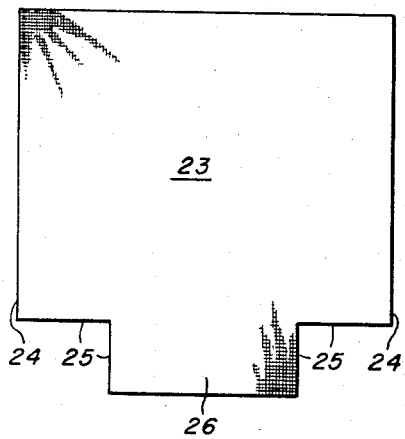
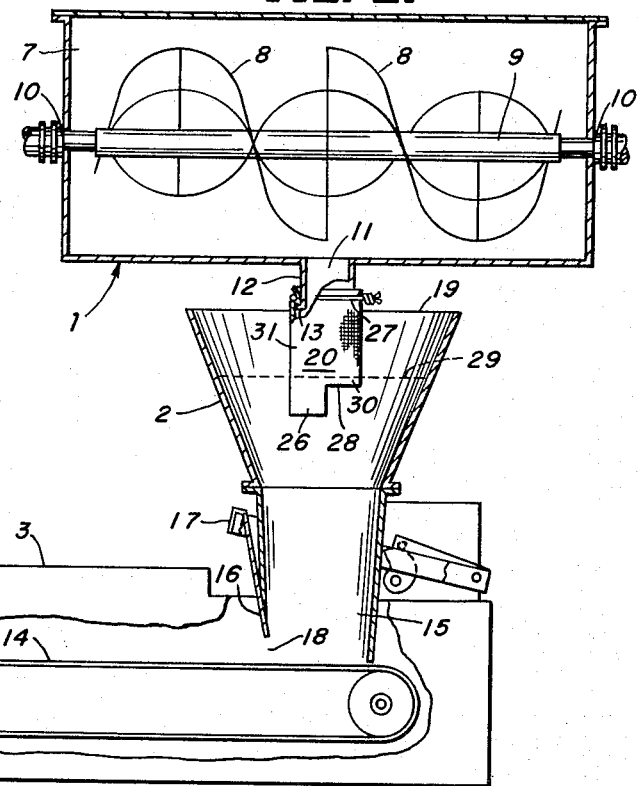
INVENTORS.
JOHN V. CLANCY and
JOHN F. KEARNS
By Donald G. Dalton
Attorney United States Patent Office 3,358,970
Patented Dec. 19, 1967

3,358,970
AUTOMATIC SHUT-OFF FOR INTERRUPTING FLOW OF GRANULAR MATERIAL TO A SUPPLY HOPPER
John V. Clancy, Neville Township, Allegheny County, and John F. Kearns, Shaler Township, Allegheny County, Pa., assignors to United States Steel Corporation, a corporation of Delaware
Filed June 7, 1966, Ser. No. 555,809
8 Claims. (Cl. 259—45)

ABSTRACT OF THE DISCLOSURE

An apparatus for regulating the flow of granular material into a hopper in accordance with varying rates at which such material is withdrawn from the lower end thereof and in a manner effective to maintain the hopper filled with material to a predetermined level. An apparatus of the character indicated in which the flow regulation is effected by a flexible sleeve depending from a downwardly facing opening of a material supply means, the sleeve having a length such that its lower end is positioned below the said predetermined level of material in the hopper.

---

This invention relates to apparatus for regulating the feed of granular material, such as sand, into a supply hopper from which it is withdrawn intermittently in measured batches. It relates, more particularly, to a control device in the form of a flexible sleeve or flap valve on the lower end of a vertically extending pipe or supply conduit which operates automatically to control the flow of the material from a mixer through the supply pipe and to maintain the material at a predetermined level in the hopper.

The invention, more specifically, pertains to batching apparatus that operates to deliver measured quantities of sand or other granular material for use in subsequent processing operations. Such apparatus, generally stated, comprises a blender or mixer which is operated continuously and delivers a mixture of the material to a supply hopper, and a weigh feeder which is operated intermittently to withdraw measured quantities of the material from the lower end of the supply hopper. In order to prevent the material from overflowing the hopper or falling to an undesired low level therein, the delivery of material from the mixer to the supply hopper must be regulated in accordance with its withdrawal therefrom by the weigh feeder.

One of the principal objects of this invention, accordingly, is to provide in batching apparatus of the type indicated above a control which will automatically regulate the flow of the material from the mixer into the hopper in a manner which will maintain the supply of material therein at a predetermined level. A further and related object of the invention is to provide an automatically controlled regulation of the character indicated which is effected by a flexible sleeve or flap valve on the lower end of a vertically extending supply pipe or conduit through which the material flows from the mixer into the supply hopper for the batch weigh feeder.

Other objects and advantages of the invention will become apparent from the following description and the accompanying drawings of a preferred embodiment of the invention, in which:

FIGURE 1 is an elevational view of a mixing and batch feeding apparatus for granular material which is equipped with the flow regulating control of this invention;

FIGURE 2 is a somewhat diagrammatic and fragmentary vertical sectional view of the apparatus shown in FIGURE 1;

FIGURE 3 is a view which shows the shape of the cloth used to form the sleeve valve in the apparatus shown in FIGURE 2; and FIGURE 4 is a perspective view of the sleeve valve which is formed from the cloth shown in FIGURE 3.

The drawings show the general arrangement of component parts of an apparatus for mixing and forming measured batches of sand or other granular material for subsequent processing operations. As shown in FIGURE 1, this apparatus comprises a blender 1 for mixing the granular material and delivering it to a supply hopper 2. The mixture of granular material is removed from the lower end of the hopper 2 by a weigh feeder 3 which delivers it to an inclined discharge chute 4 for gravitational movement into the bucket 5 of a skip hoist that is mounted for vertical movement along the trackway 6 to a dumping position where its contents may be transferred to other processing apparatus, which in accordance with design requirements may be located to receive the material directly from the discharge chute 4. The blender 1 and weigh feeder 3 are conventional units and only sufficient structure thereof has been shown diagrammatically in the drawings to enable an understanding of the principles of this invention.

The blender 1 may be any conventional mixer suitable for mixing sand or other granular materials. For example, it may be a Ribbon Blender of the Cleveland Mixer Company of Bedford, Ohio. As shown in FIGURE 2, it comprises a compartment 7 in which the granular material is mixed by ribbon elements 8 that are mounted on and extend spirally of a drive shaft 9, which is rotatably supported by bearings 10 at opposite ends of the compartment 7. The ribbon mixer elements 8 are illustrated diagrammatically as being arranged on the shaft 9 in two sets with their helices advancing in opposite directions and operating to move the material toward the central discharge opening 11 in the bottom of the compartment 7. Upon operation of the shaft 9, which is rotated continuously, the elements 8 mix the material and move it continuously to the opening 11 for gravitational movement therethrough. A pipe or conduit 12 having a flange 13 at its lower end and extending downwardly from the opening 11 operates to direct the flow of material from the blender 1 into the hopper 2.

The weigh feeder 3 may be any conventional batch feeder, for example the W. & T. Merchen scale feeder of the Wallace & Tiernan Company, Belleville, N.J., and is shown as comprising an endless belt conveyor 14 for removing the material from the bottom 15 of the hopper 2. The conveyor 14 forms part of a scale beam which includes control mechanism (not shown) for stopping its operation when a measured amount of the material has been delivered into the discharge chute 4. The feeder 3 is operated intermittently and the amount of material withdrawn from the hopper 2 during each operation of the conveyor 14 is determined by the vertical position of a gate 16 which is adjusted by control lever 17 that controls the size of an opening 18 through which the material is withdrawn from the lower end of the hopper 2. The material in the hopper 2 should be maintained at a substantially constant vertical level for proper operation of the feeder 3.

Continuous operation of the blender 1 is required in order that a uniform product will be delivered at all times to the hopper 2. Since the weigh feeder 3 operates intermittently, the flow of material from the mixer 1 through the pipe 12 to the hopper 2 must be regulated in accordance with the withdrawal of material by the feeder 3. This is necessary both to keep the material from overflowing the upper edge 19 of the hopper 2 when the feeder 3 is not operating to withdraw material therefrom, and to maintain the material in the hopper 2 at the level required for operation of the feeder 3. For this purpose and in accordance with the principles of this invention, a flap-valve in the form of a flexible sleeve 20 is provided on the lower end of the pipe 12, the flange 13 of which is positioned at about the same vertical as the upper edge 19 of the hopper 2. The sleeve 20 has a length such that it extends vertically below the edge 19 a substantial distance into the interior of the hopper 2. The sleeve 20 is fabricated from a piece 23 of heavy flexible cloth, such as canvas webbing, having a shape as shown in FIGURE 3, and a dimension between its side edges 24 at least equal to the circumference of the pipe 12 so that the edges 24 may be sewed to form a cylinder when it is fastened to the lower end of the pipe 12. The lower end of the cloth 23 is cut away along the lines 25 to provide a flap 26 at the lower end of the sleeve 20. The flap 26 has a dimension between the parallel lines 25 such that it extends over about half the circumference of the sleeve 20 when it is secured to the pipe 12 as shown in FIGURE 2. The sleeve 20 is fastened to the pipe 12 by a wire 27 which is tied around the lower end of the pipe 12 above its flange 13.

In operation of the batching apparatus described above, the sleeve 20 has proved effective to closely regulate the flow of material from the mixer 1 in accordance with the withdrawal of material by the belt 14 of the feeder 3. The sleeve 20, more specifically, performs its material flow regulating action in such manner that it maintains the hopper 2 filled with material to a level above its lower end 28, such as that designated by the broken line 29, its lower end portion 30 including the flap 26 being embedded in the material. Although the theory of this regulating action of the sleeve 20 is not known, the level 29 is maintained at a substantially constant vertical height at all times during operation of the apparatus and, on the basis of visual observations, does not appear to be affected by the operating condition of the conveyor belt 14. When the belt 14 stops and discontinues the removal of material through the opening 18, the portion 31 of the sleeve 20 above the line 29 has been observed to expand with a bulging action which indicates the downward flow of the material therethrough has been interrupted. The interior of both the pipe 12 and the sleeve 20 is of course filled with material at all times, which gravitates downwardly from the compartment 7 under pressure produced by the mixing blades 8 which rotate continuously and tend to force the material through the discharge opening 11. Thereafter, the portion 30 of the sleeve 20 has been observed to contract when the belt 14 is subsequently operated to remove material from the hopper 2, thus indicating that material is again flowing through the sleeve 20 to replace that withdrawn by the belt 14. Since the level 29 does not change, as far as can be observed visually, when the belt 14 is operated to remove material from the hopper 2, it will be apparent that the sleeve 20 regulates the flow of material from the mixer 1 in accordance with the rate at which it is withdrawn by the belt 14.

The use of a solid pipe as an extension on the lower end of the pipe 12, in place of the flexible sleeve 20, has been tried but found ineffective to cut off the flow of material into the hopper 2. When a solid pipe extension of this character was used, the pressure on the material created by the blades 8 caused it to build up with a pumping action around the outer surface of the pipe extension until it overflowed the upper hopper edge 19.

The use of sleeves 20 omitting the flap 26 on the lower end has also been tried and been found to provide a cut-off action that stops the flow through the pipe 12 when the belt 14 is stopped, which is not had when a solid pipe extension as described above is employed. However the cut-off action of a sleeve 20 of this character is not as effective as one with a flap 26 since the level 29 at which the cut-off action takes place will vary. The use of sleeves 20 with a flap 26 accordingly represents the preferred practice of the invention.

While one embodiment of my invention has been shown and described, it will be apparent that adaptations and modifications may be made without departing from the scope of the appended claims.

We claim:
1. In apparatus for controlling the flow of granular material into a hopper from which it is withdrawn intermittently in batches, the combination with said hopper of a vertically extending supply pipe for delivering said material to said hopper, said pipe being located over said hopper and having its lower end terminating at a point above the material therein, and a flexible sleeve of cylindrical shape extending downwardly from said pipe lower end through which said material flows from said pipe into said hopper, said sleeve operating to control the downward movement of the material through said pipe and to maintain the supply of material in said hopper at a predetermined vertical level.

2. A control apparatus as defined in claim 1 characterized by said sleeve having a length such that its lower end when hanging freely is below said predetermined level.

3. A control apparatus as defined in claim 2 characterized by the said lower end of said sleeve being normally embedded in the material in said hopper.

4. A control apparatus as defined in claim 2 characterized by said sleeve being formed with a flap depending from one side of its said lower end that extends vertically below the other side thereof.

5. A control apparatus as defined in claim 4 characterized by said flap when said sleeve is in a free-hanging position having a semi-cylindrical shape.

6. A control apparatus as defined in claim 1 characterized by the provision of a continuously operating mixer having a bottom discharge opening connected with the upper end of said pipe, and through which a mixture of said material is supplied under pressure to said supply pipe and hopper.

7. A control apparatus as defined in claim 6 characterized by the provision of means operating intermittently to withdraw measured batches of said material from the lower end of said hopper.

8. In a control of the character described for regulating the flow of granular material, the combination with a supply means having a vertically downwardly facing opening through which a mixture of said granular material is forcibly discharged, a supply hopper under said opening for receiving the said material flowing therethrough, and means operating intermittently to remove measured batches of said material from the lower end of said hopper, of a control for regulating the flow of said material from said supply means through said opening into said hopper to maintain the supply of material in said hopper at a predetermined vertical level comprising a flexible sleeve depending from said opening and having a length such that it extends below said predetermined level, said sleeve operating in response to said hopper being filled with material to said predetermined level to interrupt the flow of material through said opening into said hopper.

References Cited

UNITED STATES PATENTS

| | | | |
|---|---|---|---|
| 1,461,936 | 7/1923 | Richards | 259—9 |
| 2,779,510 | 1/1957 | Wilson et al. | 259—72 X |
| 2,863,651 | 12/1958 | McBride | 259—154 |
| 3,182,968 | 5/1965 | Geerlings | 259—9 |

ROBERT W. JENKINS, *Primary Examiner.*